INVENTOR.
SIEGFRIED ZOBEL
KURT ZATTLER

United States Patent Office 3,505,938
Patented Apr. 14, 1970

3,505,938
PHOTOGRAPHIC CAMERA WITH BUILT-IN LIGHT METER
Siegfried Zobel and Kurt Zattler, Munich, Germany, assignors to Agfa-Gevaert Aktiengesellschaft, Leverkusen, Germany
Filed Mar. 26, 1968, Ser. No. 716,011
Claims priority, application Germany, Mar. 31, 1967, A 55,313
Int. Cl. G03b 7/16
U.S. Cl. 95—10
14 Claims

ABSTRACT OF THE DISCLOSURE

A photographic camera which comprises a built-in exposure control and can be used with electronic flash or with a built-in flash unit. The built-in flash unit comprises a socket which can receive a single flash bulb or a multiple flash bulb holder whereby a pin automatically disconnects a light-sensitive receiver from the light meter of the exposure control. Such disconnection also takes place when the electronic flash is attached to an accessory shoe on the camera housing. The chamber which accommodates the battery contains a set of fixed resistors whose resistances are characteristic of different guide numbers. A selector is movable by hand to connect into the circuit of the exposure control that resistor whose resistance is characteristic of the available electronic flash. A switching unit in the circuit of the exposure control changes its condition in automatic response to attachment of a flash bulb, a multiple flash bulb holder or an electronic flash to thereby allow for adjustment of the light meter independently of the light-sensitive receiver. The aperture size can be varied by the focussing device, by way of the light meter, when the camera is set for operation with flash bulbs or with electronic flash.

BACKGROUND OF THE INVENTION

The present invention relates to improvements in photographic cameras with built-in light meters. More particularly, the invention relates to improvements in cameras wherein the exposure time and/or the diaphragm aperture is determined automatically as a function of scene brightness and which can be used with equal advantage with an illuminating arrangement.

SUMMARY OF THE INVENTION

It is an object of the invention to provide a motion picture camera or a still camera which can be used with different types of illuminating arrangements, for example, with electronic flash units having different guide numbers.

Another object of the invention is to provide a camera which, in addition to being capable of operating with different types of electronic flash units, can be used with equal advantage with flash units which utilize individual flash bulbs or multiple flash bulb holders.

A further object of the invention is to provide a camera of the above outlined character wherein at least one of the exposure values can be set automatically when the camera is used with an illuminating arrangement, for example, with a flash unit utilizing multiple flash bulb holders or individual flash bulbs.

An additional object of the invention is to provide a camera wherein the diaphragm aperture can be varied as a function of the distance from the subject when the camera is used with an illuminating arrangement.

The improved camera can be set for operation in daylight or with artificial illumination and comprises adjustable diaphragm and shutter mechanisms, a light meter operative to effect adjustments of at least one of these mechanisms, light-sensitive receiver means exposed to scene light, switching means having several conditions of adjustment in one of which it connects the light-sensitive receiver means with the light meter so that the latter adjusts the one mechanism as a function of scene brightness when the camera is set for operation in daylight, an illuminating arrangement (e.g., an electronic flash) having a predetermined guide number and being movable between operative and inoperative positions (for example, the electronic flash can be attached to or disconnected from an accessory shoe on the camera housing), a plurality of resistors each having a resistance corresponding to or being characteristic of a different guide number one of which is the guide number of the illuminating arrangement, selector means operable by hand for connecting one of the resistors in circuit with the switching means so that the resistance of the thus selected resistor corresponds to the guide number of the available illuminating arrangement, and actuating means arranged to change the condition of the switching means in response to movement of illuminating arrangement to operative position so that the switching means then connects the light meter in circuit with the one resistor and the light meter adjusts the one mechanism as a function of the resistance of the one resistor, i.e., as a function of the guide number of the illuminating arrangement.

In accordance with another feature of the invention, the camera further comprises a built-in second illuminating arrangement (for example, a flash unit using discrete flash bulbs or multiple flash bulb holders) having a first portion (e.g., a fixed or indexible socket) mounted in the camera housing and a second portion (e.g., a discrete flash bulb or a multiple flash bulb holder) movable relative to the first portion between an operative and an idle position, and second actuating means for changing the condition of switching means in response to movement of the second portion to operative position so that the light-sensitive receiver means is then disconnected from the light meter.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
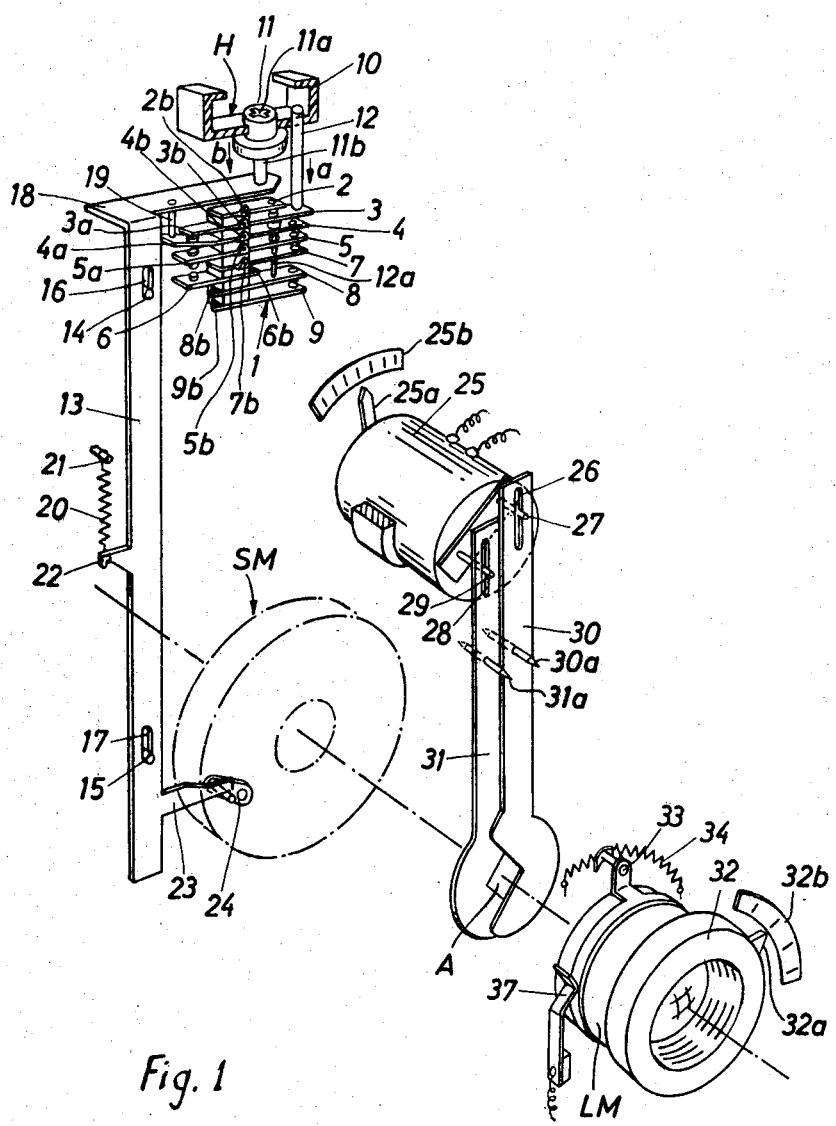
FIG. 1 is a fragmentary exploded perspective view of a camera which embodies our invention.
Figure 2:
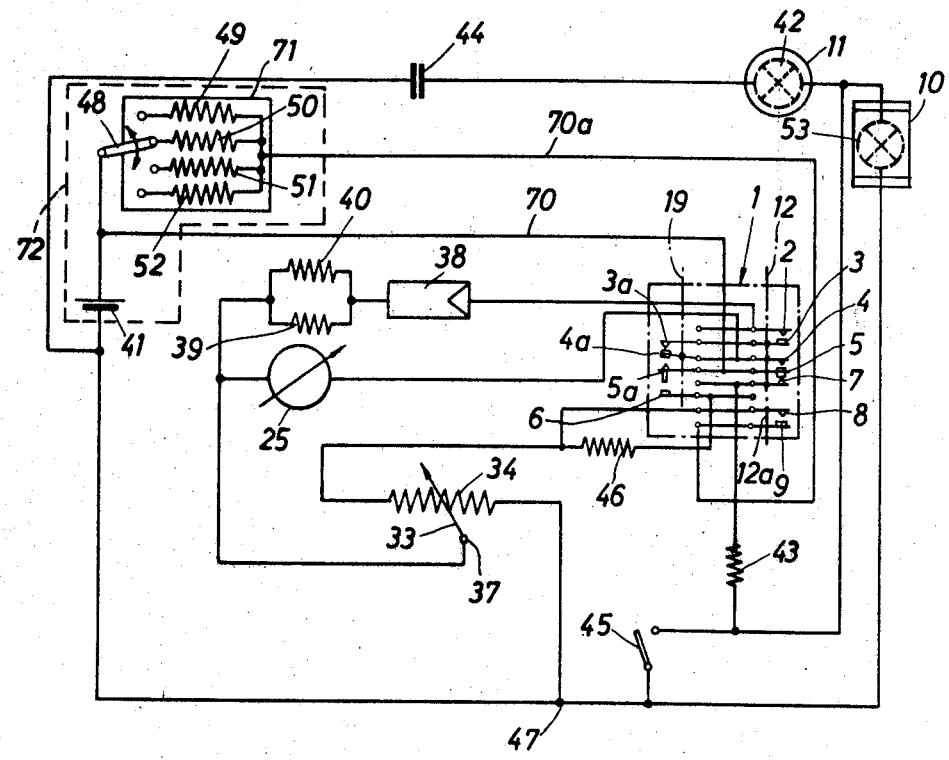
FIG. 2 illustrates the electric circuit of the camera in a condition when the camera is ready to make exposures without artificial illumination of the subject.

FIGS. 1 and 2 illustrate a portion of a photographic camera which comprises a housing H having a top wall provided with an accessory shoe 10. The interior of the housing H accommodates a switching unit 1 including two rows of elastic contacts or tongues 2, 3, 4, 5, 7, 8, 9, and 3a, 4a, 5a and 6. The contacts 2, 3–3a, 4–4a, 5–5a, 6, 7, 8, 9 are respectively provided with terminals 2b, 3b, 4b, 5b, 6b, 7b, 8b, 9b. The accessory shoe 10 can accommodate the foot of a detachable illuminating arrangement, e.g., an electronic flash unit 53 (shown in FIG. 2 by broken lines). Furthermore, the top wall of the housing H is provided with an opening for an indexable or stationary socket 11 which forms a first part of a second illuminating arrangement and has a cruciform recess 11a for the plug of a single flash bulb or for the plug of a multiple flash bulb holder 42 (shown in FIG.

2 by broken lines). The socket 11 is located in the space surrounded by the shoe 10. A first actuating pin 12 is reciprocable in the top wall of the housing H and normally extends into the space enclosed by the shoe 10 to be depressed in response to insertion of the foot of the electronic flash 53, i.e., in response to movement of the electronic flash to operative position. The pin 12 is biased to its upper end position by the elastic contact 3 but moves downwardly (arrow a) when the flash 53 is properly attached to the housing H. The pin 12 then changes the condition of the switching unit 1 in a manner to be described later.

The recess 11a of the socket 11 normally receives the upper end portion of a displacing pin 11b which is depressed and moves downwardly (arrow b) when the recess 11a receives the plug of a single flash bulb or the plug of a multiple flash bulb holder 42, i.e., when the bulb or holder assumes an operative position. The purpose of the pin 11b is to change the position of an adjusting member 13 which resembes a vertically reciprocable slide and is provided with vertical slots 16, 17 for two guide pins 14, 15 mounted in the housing H. The lower end of the displacing pin 11b bears against a plate-like top portion or ledge 18 of the adjusting member 13, and this ledge 18 carries a second actuating pin 19 which extends downwardly and can engage the elastic contact 4a of the switching unit 1. The adjusting member 13 is biased upwardly by a helical return spring 20 which operates between a post 21 affixed to the camera housing H and an arm 22 of the adjusting member. The lower portion of the member 13 is provided with an extension or arm 23 which can adjust a portion 24 of a shutter mechanism SM. The exact construction of the mechanism SM forms no part of our invention; it suffices to say that the adjusting member 13 can select a predetermined exposure time when its ledge 18 is depressed by the displacing pin 11b in response to attachment of a flash bulb or a multiple flash bulb holder 42 to the socket 11.

The exposure control of the camera further comprises a light meter 25 of known design which is turnable in its entirety or in part and has adjusting pins 27, 29 extending into elongated slots 26, 28 respectively provided in the upper arms of two-armed diaphragm vanes or blades 30, 31 constituting a simple diaphragm mechanism and adapted to define an exposure aperture A whose size varies as a function of changes in scene brightness when the camera is used to make exposures in daylight. The light meter 25 has an index 25a cooperating with a fixed scale 25b to indicate the scene brightness. To vanes 30, 31 are pivotable on pins 30a, 31a which are affixed to the housing H. The sensitivity of film which is being used in the camera can be accounted for by changing the initial angular position of the light meter 25. Such adjustment of the light meter 25 as a function of film sensitivity can be carried out in a manner which is well known in the art, for example, by a motion transmitting link train having a sensing element which extends into the chamber for the supply cartridge and is displaced to the extent determined by the position of a marker on the supply cartridge.

The light meter 25 could be replaced by a light meter of the type having a needle-like output member whose position is a function of scene brightness when the camera is used to make exposures in daylight and whose position is detected by a stepped scanning member which adjusts the diaphragm mechanism. When the scanning member engages the output member, it presses the latter against a fixed back support and the extent of its displacement from a starting position determines the extent of adjustment of the diaphragm mechanism as a function of the position of the output member.

A focussing member 32 is mounted on the lens mount LM of the camera and can be turned by hand. It comprises an index 32a cooperating with a fixed distance scale 32b which indicates the selected position of the focussing member. The latter is further provided with a slider 33 which cooperates with an arcuately coiled resistance wire 34 to form therewith a variable resistor whose resistance changes in response to turning of the focussing member 32. The wire 34 is connected into the electric circuit of the camera in a manner as shown in FIG. 2. The electrical connection between the slider 33 and one terminal of the light meter 25 comprises a wiper 37. It is clear that the variable resistor 33, 34 can be replaced by a set of independent fixed resistors one of which is connected in the electric circuit in each of several angular positions of the focussing member 32.

FIG. 2 illustrates a light-sensitive receiver 38 (e.g., a selenium cell) in series with two parallel-connected fixed resistors 39, 40. In this illustration, the switching unit 1 is shown in its normal condition when the camera is set for operation in daylight, i.e., when the recess 11a of the socket 11 is empty because the holder 42 is in a detached or idle position and when the foot of the electronic flash 53 is withdrawn from the accessory shoe 10, i.e., when the flash 53 assumes its inoperative position. The switches including the contacts 2–3, 3a–4a and 5–7 are closed and the remaining switches are open. The switches 2–3 and 3a–4a connect the light meter 25 in series with the light-sensitive receiver 38 and with the resistors 39, 40. The receiver 38 is exposed to scene light and produces a potential difference whose magnitude is a function of scene brightness. Therefore, the angular position of the light meter 25 is also a function of scene brightness, and such angular position determines the size of the aperture A defined by the diaphragm vanes 30, 31. The exposure time can be selected by manual adjustment of the shutter mechanism SM or automatically by an operative connection (not shown) between the light meter 25 and the shutter mechanism. When the camera is used to make exposures in daylight, the spring 20 maintains the adjusting member 13 in an upper end position in which the pins 14, 15 abut against the surfaces in the lowermost portions of the slots 17, 18.

If the user wishes to make an exposure with flash, for example, with light furnished by one of several flash bulbs installed in a "Flashcube" or an analogous multiple flash bulb holder 42, the plugs of the holder 42 inserted into the recess 11a of the socket 11, operative position of the holder so that it depresses the pin 11b in the direction indicated by arrow b whereby the pin 11b displaces the adjusting member 13 by way of the ledge 18 and causes the extension 23 of the adjusting member to change the position of the portion 24 so that the shutter mechanism SM is ready to furnish an exposure time which is appropriate for making exposures with a flash bulb. As the ledge 18 moves downwardly, the actuating pin 19 changes the position of several contacts in the switching unit 1. The pin 19 causes disconnection of the light-sensitive receiver 38 from the circuit including the light meter 25 and prepares a charging circuit for that flash bulb in the multiple flash bulb holder 42 which faces the subject. This charging circuit includes a battery 41 or an analogous source of electrical energy and the variable resistor 33, 34. When the actuating pin 19 is moved downwardly, it closes the switch 5a–6. The switches 5–7 and 3a–4a remain closed. In addition to the aforementioned parts, the charging circuit for one flash bulb in the multiple flash bulb holder 42 comprises a fixed resistor 43 and a capacitor 44. The flash bulb is fired in response to closing of a synchronizing switch 45. This switch is closed in automatic response to release of the shutter mechanism SM in a manner well known from the art of cameras with built-in or detachable flash units.

The diaphragm mechanism including the vanes 30, 31 is adjusted in the following way: The switch 5a–6 (which is closed when the plug of the multiple flash bulb holder 42 is inserted into the recess 11a of the socket 11) complete a series connection between a fixed resistor 46 and the resistance wire 34. The resistor 46 is then connected with one pole of the battery 41 by way of the switch 5a–6 and a conductor 70. The other pole of the battery 41 is connected to a junction 47 and by way of this junction with one terminal of the resistance wire 34. The resistance of the resistor 46 is selected in such a way that it reflects the guide number of the flash bulb which is ready to be fired. The slider 33 is connected with one terminal of the light meter 25 by way of the wiper 37; the other terminal of the light meter is connected with one pole of the battery 41 by way of the switch 4a–5a which is closed in response to depression of the actuating pin 19. Thus, the strength of the current which flows through the light meter 25 (and hence the size of the aperture A) depends on the position of the slider 33 with reference to the wire 34 because the circuit of the light meter is completed by way of the slider 33, wire 34 and junction 47. The slider 33 is adjusted by the focussing member 32 so that the aperture size is a function of the distance from the subject. More accurately stated, the aperture size is a function of the angular position of the focussing member 32. The resistor 46 brings about an adjustment of the aperture size as a function of the guide number of the flash bulb and the focussing member 32 brings about an adjustment of the aperture size as a function of the distance from the subject. The exposure time is determined automatically as soon as the plug of the flash bulb holder 42 is inserted into the recess 11a of the socket 11. The adjustment of aperture size in dependency on the guide number is a basic adjustment and the adjustment of aperture size as a function of the angular position of the focussing member 32 is superimposed upon such basic adjustment.

If the user thereupon decides to use an electronic flash 53, the foot of the electronic flash is inserted into the accessory shoe 10 so that it depresses the actuating pin 12. Of course, the multiple flash bulb holder 42 (or a single flash bulb) must be detached from the socket 11 prior to attachment of the electronic flash 53. The pin 12 is depressed in the direction indicated by arrow $a$ and changes the condition of the switching unit 1 by closing the switch 8–9 through the intermediary of a pin 12a The pin 12 also closes the switch 4–5. The switch 3a–4a remains closed. The light meter 25 is then connected in circuit with one of several fixed resistors 49, 50, 51, 52 each having a resistance which is indicative of a different guide number. The appropriate resistor (e.g., the resistor 50) can be chosen by hand in response to a change in the position of a selector switch 48 which can connect one pole of the battery 41 with one of the resistors 49–52 at a time. The user knows the guide number of the electronic flash 53 and adjusts the position of the selector switch 48 accordingly. One terminal of the resistance wire 34 is then connected with the one pole of the battery 41 by way of the switch 8–9, a conductor 70a, and resistor 50, and the other terminal of the wire 34 is connected with the other pole of the battery by way of the junction 47. One terminal of the light meter 25 is connected with the one pole of the battery 41 by way of the switch 4–5 and its other terminal is connected with the other pole of the battery by way of the slider 33, wire 34 and junction 47. Thus, the angular position of the light meter 25 can be changed again as a function of the distance from the subject because the slider 33 is connected with the focussing member 32. This determines the aperture size. The basic adjustment of the light meter 25 (and hence of the aperture size) depends on the position of the selector switch 48 (i.e., on the guide number of the electronic flash 53) and the adjustment of the aperture size in response to turning of the focussing member 32 is superimposed upon such basic adjustment. The electronic flash 53 is fired in response to closing of the synchronizing switch 45, i.e., in response to release of the shutter mechanism SM. This mechanism is adjustable by hand to furnish an appropriate exposure time for operation with the flash 53.

The resistors 49–51 are supported on a plate-like conductor 71 which can be mounted in chamber 72 of the housing H. This chamber also accommodates the battery 41.

The light-sensitive receiver 38 can be replaced by a light-sensitive resistor and a source of electrical energy. Also, the battery 41 can be replaced by a stack of batteries or by one or more miniature cells.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic camera which can be set for operation in daylight and artificial light, a combination comprising adjustable diaphragm and shutter mechanisms; a light meter operative to effect adjustment of at least one of said mechanisms; light-sensitive means exposed to scene light; switching means having several conditions in one of which it connects said light-sensitive means with said light meter so that the latter adjusts said one mechanism as a function of scene brightness when the camera is set for operation in daylight; an illuminating arrangement having a predetermined guide number and movable between operative and inoperative positions; a plurality of resistors each having a resistance corresponding to a guide number one of which is said predetermined guide number; selector means for connecting one of said resistors in circuit with said switching means whereby the resistance of said one resistor corresponds to said predetermined guide number; and actuating means arranged to change the condition of said switching means in response to movement of said illuminating arrangement to operative position so that said switching means then connects said light meter in circuit with said one resistor and said light meter adjusts said one mechanism as a function of the resistance of said one resistor.

2. A combination as defined in claim 1, further comprising a built-in second illuminating arrangement having a first portion mounted in the housing of the camera and a second portion movable relative to said first portion between an operative and an idle position, and second actuating means for changing the condition of said switching means in response to movement of said second portion to operative position so that said light-sensitive means is then disconnected from said light meter.

3. A combination as defined in claim 2, further comprising adjusting means operative to adjust the other mechanism in response to movement of the second portion of said second illuminating means to operative position.

4. A combination as defined in claim 2, further comprising adjustable focussing means and variable resistor means connected in circuit with said light meter in response to a change in the condition of said switching means from said one condition and arranged to vary its resistance as a function of adjustment of said focussing means.

5. A combination as defined in claim 1, wherein said switching means comprises two rows of discrete contacts.

6. A combination as defined in claim 1, further comprising a housing and an accessory shoe provided on said housing, said illuminating arrangement comprising a portion which is received in said shoe in the operative position of said illuminating arrangement, said actuating means normally extending into said shoe and being displaced by said portion in the operative position of said illuminating arrangement to thereby change the condition of said switching means.

7. A combination as defined in claim 6, wherein said actuating means is a reciprocatory pin.

8. A combination as defined in claim 1, further comprising a housing having a chamber and a source of electrical energy in said chamber, said switching means being arranged to connect said source with said light meter in the operative position of said illuminating arrangement.

9. A combination as defined in claim 8, further comprising a support provided in said chamber, said resistors being secured to said support.

10. A combination as defined in claim 1, wherein said one mechanism is said diaphragm mechanism and further comprising means for influencing the adjustment of said diaphragm mechanism as a function of the distance from the subject in the operative position of said illuminating arrangement.

11. A combination as defined in claim 10, wherein said influencing means comprises variable resistor means in series with said light meter, focussing means arranged to change the resistance of said variable resistor means, and a source of electrical energy in circuit with said light meter in the operative position of said illuminating arrangement.

12. A combination as defined in claim 1, wherein said illuminating arrangment is an electronic flash unit.

13. A combination as defined in claim 2, wherein said first portion of said second illuminating arrangement is a socket and said second portion comprises at least one flash bulb which is attached to said socket in the operative position thereof.

14. A combination as defined in claim 13, wherein said second portion is arranged to effect adjustment of said shutter mechanism for a predetermined exposure time in response to movement to operative position.

References Cited

UNITED STATES PATENTS

| | | | |
|---|---|---|---|
| 3,175,479 | 3/1965 | Beach et al. | 95—11 |
| 3,318,215 | 5/1967 | Schiks | 95—11.5 |
| 3,326,103 | 6/1967 | Topaz | 95—10 |
| 3,392,643 | 7/1968 | Rentschler | 95—64 XR |
| 3,406,619 | 10/1968 | Rentschler | 95—10 |

NORTON ANSHER, Primary Examiner

FRED L. BRAUN, Assistant Examiner

U.S. Cl. X.R.

95—64